United States Patent
Qian

(10) Patent No.: US 9,950,681 B2
(45) Date of Patent: Apr. 24, 2018

(54) METHOD FOR SETTING INTERNAL USAGE SCENARIO OF VEHICLE, VEHICLE-MOUNTED DEVICE, AND NETWORK DEVICE

(71) Applicant: Huawei Technologies Co., Ltd., Shenzhen (CN)

(72) Inventor: Li Qian, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/255,305

(22) Filed: Sep. 2, 2016

(65) Prior Publication Data

US 2016/0368438 A1  Dec. 22, 2016

Related U.S. Application Data

(63) Continuation of application No. PCT/CN2015/073420, filed on Feb. 28, 2015.

(30) Foreign Application Priority Data

Mar. 3, 2014 (CN) .......................... 2014 1 0075325

(51) Int. Cl.
  *B60R 16/00* (2006.01)
  *G07C 5/00* (2006.01)
  (Continued)

(52) U.S. Cl.
  CPC ............ *B60R 16/037* (2013.01); *G07C 5/008* (2013.01); *H04L 67/125* (2013.01)

(58) Field of Classification Search
  CPC ......... B60R 16/00; B60R 16/037; G07C 5/00; G07C 5/008; H04L 67/00; H04L 67/125
  See application file for complete search history.

(56) References Cited

U.S. PATENT DOCUMENTS 8,527,146 B1   9/2013  Jackson et al.
8,957,790 B2 * 2/2015  Cornell .................. G01C 23/00
                                                   340/964
(Continued)

FOREIGN PATENT DOCUMENTS

CN    101301881 A    11/2008
CN    100509488 A     7/2009
(Continued)

OTHER PUBLICATIONS

Foreign Communication From a Counterpart Application, PCT Application No. PCT/CN2015/073420, English Translation of International Search Report dated May 28, 2015, 2 pages.

(Continued)

*Primary Examiner* — Yonel Beaulieu
(74) *Attorney, Agent, or Firm* — Conley Rose, P.C.

(57) ABSTRACT

The method for setting an internal usage scenario of a vehicle is presented, which includes obtaining, by a vehicle-mounted device, identity information of a user and feature information, where the user is a user who is using a vehicle in which the vehicle-mounted device is located, and the feature information is used to represent an internal first usage scenario of the vehicle; sending, by the vehicle-mounted device, the identity information of the user and the feature information to a network device; receiving, by the vehicle-mounted device, an internal usage scenario model of the vehicle sent by the network device, where the model is obtained by the network device based on the identity information of the user and the feature information; and adjusting, by the vehicle-mounted device, a parameter of the vehicle according to the model.

18 Claims, 7 Drawing Sheets

(51) Int. Cl.
    *B60R 16/037*    (2006.01)
    *H04L 29/08*    (2006.01)

(56) References Cited

U.S. PATENT DOCUMENTS

| | | | |
|---|---|---|---|
| 9,165,412 B2* | 10/2015 | Gellatly | G07C 5/008 |
| 2010/0039247 A1* | 2/2010 | Ziegler | G06Q 10/06 |
| | | | 340/436 |
| 2010/0228428 A1* | 9/2010 | Harshbarger | G06Q 10/06 |
| | | | 701/31.4 |
| 2012/0046982 A1* | 2/2012 | Wellman | G05D 1/0282 |
| | | | 705/7.12 |
| 2013/0197674 A1 | 8/2013 | Lowry | |
| 2013/0226449 A1 | 8/2013 | Rovik et al. | |
| 2015/0045988 A1 | 2/2015 | Gusikhin et al. | |

FOREIGN PATENT DOCUMENTS

| | | |
|---|---|---|
| CN | 103106065 A | 5/2013 |
| CN | 103187056 A | 7/2013 |
| JP | 2004330891 A | 11/2004 |

OTHER PUBLICATIONS

Foreign Communication From a Counterpart Application, PCT Application No. PCT/CN2015/073420, English Translation of Written Opinion dated May 28, 2015, 9 pages.

Machine Translation and Abstract of Chinese Publication No. CN103187056, Jul. 3, 2013, 18 pages.

Foreign Communication From a Counterpart Application, Chinese Application No. 201410075325.6, Chinese Office Action dated Sep. 19, 2017, 7 pages.

\* cited by examiner

METHOD FOR SETTING INTERNAL USAGE SCENARIO OF VEHICLE, VEHICLE-MOUNTED DEVICE, AND NETWORK DEVICE

CROSS-REFERENCE TO RELATED APPLICATIONS

This application is a continuation of International Application No. PCT/CN2015/073420, filed on Feb. 28, 2015, which claims priority to Chinese Patent Application No. 201410075325.6, filed on Mar. 3, 2014, both of which are incorporated herein by reference in their entities.

TECHNICAL FIELD

The present disclosure relates to the field of information communications technologies, and in particular, to a method for setting a usage scenario, a vehicle-mounted device, and a network device.

BACKGROUND

As the society progresses and the economy develops, vehicles are becoming increasingly popularized. When driving or using a vehicle, a user sets one or more of a seat height, a door mirror position, a steering wheel height, light intensity, an acoustic sound, or the like of the vehicle, and locally stores information about each set parameter as preference parameter information. When the user uses the vehicle next time, after the user is identified, the parameters of the vehicle may be set according to the previously stored preference parameter information, and the user does not need to set the parameters again.

However, it is found in a use process that, when using a different vehicle, the user needs to set parameters on the vehicle again, but cannot use preference parameter information stored in a previously used vehicle. In addition, in the foregoing method, there is only one group of preference parameter information for one user, while different preference parameter information cannot be provided for the user in different situations. Therefore, it causes great inconvenience to the user.

SUMMARY

This application provides a method for setting an internal usage scenario of a vehicle, a vehicle-mounted device, and a network device, to resolve prior-art technical problems that when using a different vehicle, a user needs to set parameters on the vehicle again but cannot use preference parameter information stored in a previously used vehicle, and that in the prior art, there is only one group of preference parameter information for one user, while different preference parameter information cannot be provided for the user in different situations, which causes inconvenience to the user.

A first aspect of embodiments of the present disclosure provides a method for setting an internal usage scenario of a vehicle, where the method includes obtaining, by a vehicle-mounted device, identity information of a user and feature information, where the user is a user who is using a vehicle in which the vehicle-mounted device is located, and the feature information is used to represent an internal first usage scenario, which is needed by the user, of the vehicle; sending, by the vehicle-mounted device, the identity information of the user and the feature information to a network device; receiving, by the vehicle-mounted device, an internal usage scenario model of the vehicle sent by the network device, where the model is obtained by the network device based on the identity information of the user and the feature information; and adjusting, by the vehicle-mounted device, a parameter of the vehicle according to the model, so that a current internal usage scenario of the vehicle is adjusted to the first usage scenario.

In a first possible implementation manner of the first aspect, after the obtaining, by a vehicle-mounted device, the feature information, the method further includes searching, by the vehicle-mounted device, an identification file of the vehicle-mounted device according to the feature information, to obtain the first usage scenario; and the sending, by the vehicle-mounted device, the feature information to a network device is sending, by the vehicle-mounted device, the first usage scenario to the network device.

With reference to the first aspect or the first possible implementation manner of the first aspect, in a second possible implementation manner of the first aspect, the obtaining, by a vehicle-mounted device, feature information is acquiring, by the vehicle-mounted device, context information of the user, where the context information is used to represent a usage scenario needed by the user.

With reference to the first aspect or the first possible implementation manner of the first aspect, in a third possible implementation manner of the first aspect, the context information is one of or a combination of multiple of a current driving parameter of the vehicle, an image parameter of the user, or an input parameter of an internal device of the vehicle.

With reference to the third possible implementation manner of the first aspect, in a fourth possible implementation manner of the first aspect, the internal usage scenario model of the vehicle is a parameter or a parameter set that is set for one or more devices of the vehicle according to a preference of the user.

With reference to the first aspect, or any one of the first to the fourth possible implementation manners of the first aspect, in a fifth possible implementation manner of the first aspect, after the adjusting, by the vehicle-mounted device, a parameter of the vehicle according to the model, so that a current internal usage scenario of the vehicle is adjusted to the first usage scenario, the method further includes detecting, by the vehicle-mounted device, whether the parameter of the vehicle is modified; and if yes, recording, by the vehicle-mounted device, a modified parameter; and sending, by the vehicle-mounted device, the modified parameter to the network device.

With reference to the first aspect, or any one of the first to the fifth possible implementation manners of the first aspect, in a sixth possible implementation manner of the first aspect, after the adjusting, by the vehicle-mounted device, a parameter of the vehicle according to the model, so that a current internal usage scenario of the vehicle is adjusted to the first usage scenario, the method further includes detecting, by the vehicle-mounted device, whether there is new feature information, where the new feature information is used to represent an internal second usage scenario, which is needed by the user, of the vehicle; and if yes, determining, by the vehicle-mounted device according to the new feature information, whether an internal usage scenario of the vehicle needs to be adjusted.

A second aspect of the embodiments of the present disclosure provides a method for setting an internal usage scenario of a vehicle, where the method includes obtaining, by a network device, identity information of a user and an internal first usage scenario, which is needed by the user, of a vehicle, where the user is a user who is using a vehicle in which the vehicle-mounted device is located; searching, by the network device according to the identity information of the user and the usage scenario, a model file of the network device for an internal usage scenario model, which corresponds to the identity information of the user and the usage scenario, of the vehicle; and sending, by the network device, the model to the vehicle-mounted device, so that the vehicle-mounted device adjusts a parameter of the vehicle according to the model, to adjust a current internal usage scenario of the vehicle to the first usage scenario.

With reference to the second aspect, in a first possible implementation manner of the second aspect, after the obtaining, by a network device, identity information of the user, the method includes searching, by the network device according to the identity information of the user, a database of the network device for an identification file corresponding to the identity information of the user; and sending the identification file to the vehicle-mounted device.

With reference to the second aspect, in a second possible implementation manner of the second aspect, before the obtaining, by a network device, an internal first usage scenario, which is needed by the user, of a vehicle, the method further includes receiving, by the network device, feature information sent by the vehicle-mounted device, where the feature information is used to represent the first usage scenario needed by the user; and searching, by the network device according to the feature information, an identification file of the network device for a usage scenario corresponding to the feature information.

With reference to the second aspect, in a third possible implementation manner of the second aspect, after the sending, by the network device, the model to the vehicle-mounted device, so that the vehicle-mounted device adjusts a parameter of the vehicle according to the model, to adjust a current internal usage scenario of the vehicle to the first usage scenario, the method further includes receiving, by the network device, a modified parameter of the vehicle sent by the vehicle-mounted device; and updating, by the network device, a parameter that corresponds to the modified parameter and that is in the model file of the network device with the modified parameter.

A third aspect of the embodiments of the present disclosure provides a vehicle-mounted device, where the vehicle-mounted device includes an obtaining unit configured to obtain identity information of a user and feature information, where the user is a user who is using a vehicle in which the vehicle-mounted device is located, and the feature information is used to represent an internal first usage scenario, which is needed by the user, of the vehicle; a sending unit configured to send the identity information of the user and the feature information to a network device; a receiving unit configured to receive an internal usage scenario model of the vehicle sent by the network device, where the model is obtained by the network device based on the identity information of the user and the feature information; and an adjustment unit configured to adjust a parameter of the vehicle according to the model, so that a current internal usage scenario of the vehicle is adjusted to the first usage scenario.

With reference to the third aspect, in a first possible implementation manner of the third aspect, the vehicle-mounted device further includes a search unit, and the search unit is configured to search an identification file of the vehicle-mounted device according to the feature information, to obtain the first usage scenario; and the sending unit is configured to send the first usage scenario to the network device.

With reference to the third aspect, or the first possible implementation manner of the third aspect, in a second possible implementation manner of the third aspect, the obtaining unit is configured to acquire context information of the user, where the context information is used to represent a usage scenario needed by the user.

With reference to the second possible implementation manner of the third aspect, in a third possible implementation manner of the third aspect, the context information is one of or a combination of multiple of a current driving parameter of the vehicle, an image parameter of the user, or an input parameter of an internal device of the vehicle.

With reference to the third aspect or the first possible implementation manner of the first aspect, in a fourth possible implementation manner of the third aspect, the internal usage scenario model of the vehicle is a parameter or a parameter set that is set for one or more devices of the vehicle according to a preference of the user.

With reference to the fourth possible implementation manner of the third aspect, in a fifth possible implementation manner of the third aspect, the vehicle-mounted device further includes a detection unit configured to detect whether the parameter of the vehicle is modified; and a recording unit configured to, when the parameter of the vehicle is modified, record a modified parameter, where the sending unit is further configured to send the modified parameter to the network device.

With reference to the third aspect, or any one of the first to the fifth possible implementation manners of the third aspect, in a sixth possible implementation manner of the third aspect, the vehicle-mounted device further includes a check unit configured to detect whether there is new feature information, where the new feature information is used to represent a second usage scenario needed by the user; and a determining unit configured to, when there is the new feature information, determine, according to the new feature information, whether an internal usage scenario of the vehicle needs to be adjusted.

A fourth aspect of the embodiments of the present disclosure provides a network device, where the network device includes an obtaining unit configured to obtain identity information of a user and an internal first usage scenario, which is needed by the user, of a vehicle, where the user is a user who is using a vehicle in which the vehicle-mounted device is located; a search unit configured to search, according to the identity information of the user and the usage scenario, a model file of the network device for an internal usage scenario model, which corresponds to the identity information of the user and the usage scenario, of the vehicle; and a sending unit configured to send the model to the vehicle-mounted device, so that the vehicle-mounted device adjusts a parameter of the vehicle according to the model, to adjust a current internal usage scenario of the vehicle to the first usage scenario.

With reference to the fourth aspect, in a first possible implementation manner of the fourth aspect, the search unit is further configured to search, according to the identity information of the user, a database of the network device for an identification file corresponding to the identity information of the user; and the sending unit is configured to send the identification file to the vehicle-mounted device.

With reference to the fourth aspect or the first possible implementation manner of the fourth aspect, in a second possible implementation manner of the fourth aspect, the network device further includes a receiving unit, where the receiving unit is configured to receive feature information sent by the vehicle-mounted device, where the feature information is used to represent the first usage scenario needed by the user; and the search unit is further configured to search, according to the feature information, an identification file of the network device for a usage scenario corresponding to the feature information.

With reference to the second possible implementation manner of the fourth aspect, in a third possible implementation manner of the fourth aspect, the receiving unit is further configured to receive a modified parameter of the vehicle sent by the vehicle-mounted device; and the network device further includes an execution unit, where the execution unit is configured to update a parameter that corresponds to the modified parameter and that is in the model file of the network device with the modified parameter.

A fifth aspect of the embodiments of the present disclosure provides a vehicle-mounted device, where the vehicle-mounted device includes a processor configured to obtain identity information of a user and feature information, where the user is a user who is using a vehicle in which the vehicle-mounted device is located, and the feature information is used to represent an internal first usage scenario, which is needed by the user, of the vehicle; and a communications module, connected to the processor, and configured to send the identity information of the user and the feature information to a network device, and receive an internal usage scenario model of the vehicle sent by the network device, where the model is obtained by the network device based on the identity information of the user and the feature information, where the processor is further configured to adjust a parameter of the vehicle according to the model, so that a current internal usage scenario of the vehicle can be the first usage scenario.

With reference to the fifth aspect, in a first possible implementation manner of the fifth aspect, the processor is further configured to search an identification file of the vehicle-mounted device according to the feature information, to obtain the first usage scenario; and the communications module is configured to send the first usage scenario to the network device.

With reference to the fifth aspect or the first possible implementation manner of the fifth aspect, in a second possible implementation manner of the fifth aspect, the processor is configured to acquire context information of the user, where the context information is used to represent a usage scenario needed by the user.

With reference to the first possible implementation manner of the fifth aspect, in a third possible implementation manner of the fifth aspect, the context information is one of or a combination of multiple of a current driving parameter of the vehicle, an image parameter of the user, or an input parameter of an internal device of the vehicle.

With reference to the fifth aspect or the first possible implementation manner of the fifth aspect, in a fourth possible implementation manner of the fifth aspect, the internal usage scenario model of the vehicle is a parameter or a parameter set that is set for one or more devices of the vehicle according to a preference of the user.

With reference to the fifth aspect, or any one of the first to the fourth possible implementation manners of the fifth aspect, in a fifth possible implementation manner of the fifth aspect, the processor is further configured to detect whether the parameter of the vehicle is modified, and when the parameter of the vehicle is modified, record a modified parameter; and the communications module is further configured to send the modified parameter to the network device.

With reference to the fifth aspect, or any one of the first to the fifth possible implementation manners of the fifth aspect, in a sixth possible implementation manner of the fifth aspect, the processor is further configured to detect whether there is new feature information, and when there is the new feature information, determine, according to the new feature information, whether an internal usage scenario of the vehicle needs to be adjusted, where the new feature information is used to represent a second usage scenario needed by the user.

A fifth aspect of the embodiments of the present disclosure provides a network device, where the network device includes a transceiver configured to obtain identity information of a user and an internal first usage scenario, which is needed by the user, of a vehicle, where the user is a user who is using a vehicle in which the vehicle-mounted device is located; and a processor, connected to the transceiver, and configured to search, according to the identity information of the user and the usage scenario, a model file of the network device for an internal usage scenario model, which corresponds to the identity information of the user and the usage scenario, of the vehicle, where the transceiver sends the model to the vehicle-mounted device, so that the vehicle-mounted device adjusts a parameter of the vehicle according to the model, to adjust a current internal usage scenario of the vehicle to the first usage scenario.

With reference to the fifth aspect, in a first possible implementation manner of the fifth aspect, the processor is further configured to search, according to the identity information of the user, a database of the network device for an identification file corresponding to the identity information of the user; and the transceiver is configured to send the identification file to the vehicle-mounted device.

With reference to the fifth aspect or the first possible implementation manner of the fifth aspect, in a second possible implementation manner of the fifth aspect, the transceiver is configured to receive feature information sent by the vehicle-mounted device, and the feature information is used to represent the first usage scenario needed by the user; and the processor is further configured to search, according to the feature information, an identification file of the network device for a usage scenario corresponding to the feature information.

With reference to the second possible implementation manner of the fifth aspect, in a third possible implementation manner of the fifth aspect, the transceiver is further configured to receive a modified parameter of the vehicle sent by the vehicle-mounted device; and the processor is further configured to update a parameter that corresponds to the modified parameter and that is in the model file of the network device with the modified parameter.

This application has the following beneficial effects.

In the foregoing method for setting an internal usage scenario of a vehicle, an internal usage scenario model of the vehicle is stored on a network device end; the vehicle-mounted device obtains identity information of a user who is using the vehicle and feature information used to represent a vehicle internal usage scenario needed by the user, and then sends the identity information and the feature information to a network device; the network device obtains the internal usage scenario model of the vehicle according to the identity information of the user and the feature information, and sends the model to the vehicle-mounted device; and after receiving the model sent by the network device, the vehicle-mounted device adjusts a parameter of the vehicle according to the model. Therefore, when using a different vehicle, the user does not need to set parameters on the vehicle again, and the vehicle-mounted device of the vehicle simply needs to send the identity information of the user and the feature information used to represent the vehicle internal usage scenario needed by the user to the network device, and then can receive the internal usage scenario model of the vehicle, where the model is obtained by the network device according to the identity information of the user and the feature information; and the vehicle-mounted device adjusts the parameter of the vehicle according to the model, thereby resolving a technical problem in the prior art that, when using a different vehicle, a user needs to set parameters on the vehicle again but cannot use preference parameter information stored in a previously used vehicle.

In addition, the vehicle-mounted device sets the parameter of the vehicle according to the internal usage scenario model, which is set according to the identity information of the user, of the vehicle, and the model corresponds to a usage scenario, that is, in the foregoing method, the vehicle-mounted device can perform scenario setting according to a scenario in which the user is currently located, which meets increasingly refined use requirements of the user, improves use comfort of the user, and resolves a technical problem that in the prior art, there is only one group of preference parameter information for one user while different preference parameter information cannot be provided for the user in different situations, causing inconvenience to the user.

DESCRIPTION OF EMBODIMENTS

Embodiments of this application provide a method for setting an internal usage scenario of a vehicle, a vehicle-mounted device, and a network device, to resolve prior-art technical problems that when using a different vehicle, a user needs to set parameters on the vehicle again but cannot use preference parameter information stored in a previously used vehicle, and that in the prior art, there is only one group of preference parameter information for one user while different preference parameter information cannot be provided for the user in different situations, which causes inconvenience to the user.

To resolve the foregoing technical problems, the embodiments of this application use the following general idea.

A method for setting an internal usage scenario of a vehicle is provided, where the method includes obtaining, by a vehicle-mounted device, identity information of a user and feature information, where the user is a user who is using a vehicle in which the vehicle-mounted device is located, and the feature information is used to represent an internal first usage scenario, which is needed by the user, of the vehicle; sending, by the vehicle-mounted device, the identity information of the user and the feature information to a network device; receiving, by the vehicle-mounted device, an internal usage scenario model of the vehicle sent by the network device, where the model is obtained by the network device based on the identity information of the user and the feature information; and adjusting, by the vehicle-mounted device, a parameter of the vehicle according to the model, so that a current internal usage scenario of the vehicle is adjusted to the first usage scenario.

To make the foregoing technical solution better understood, the following describes the foregoing technical solution in detail with reference to the accompanying drawings of the specification and specific implementation manners.

Descriptions are provided herein with reference to a vehicle-mounted device and/or a network device, where the vehicle-mounted device may be a computer, a vehicle-mounted device, or the like that is disposed in a vehicle.

Embodiment 1

Figure 1:
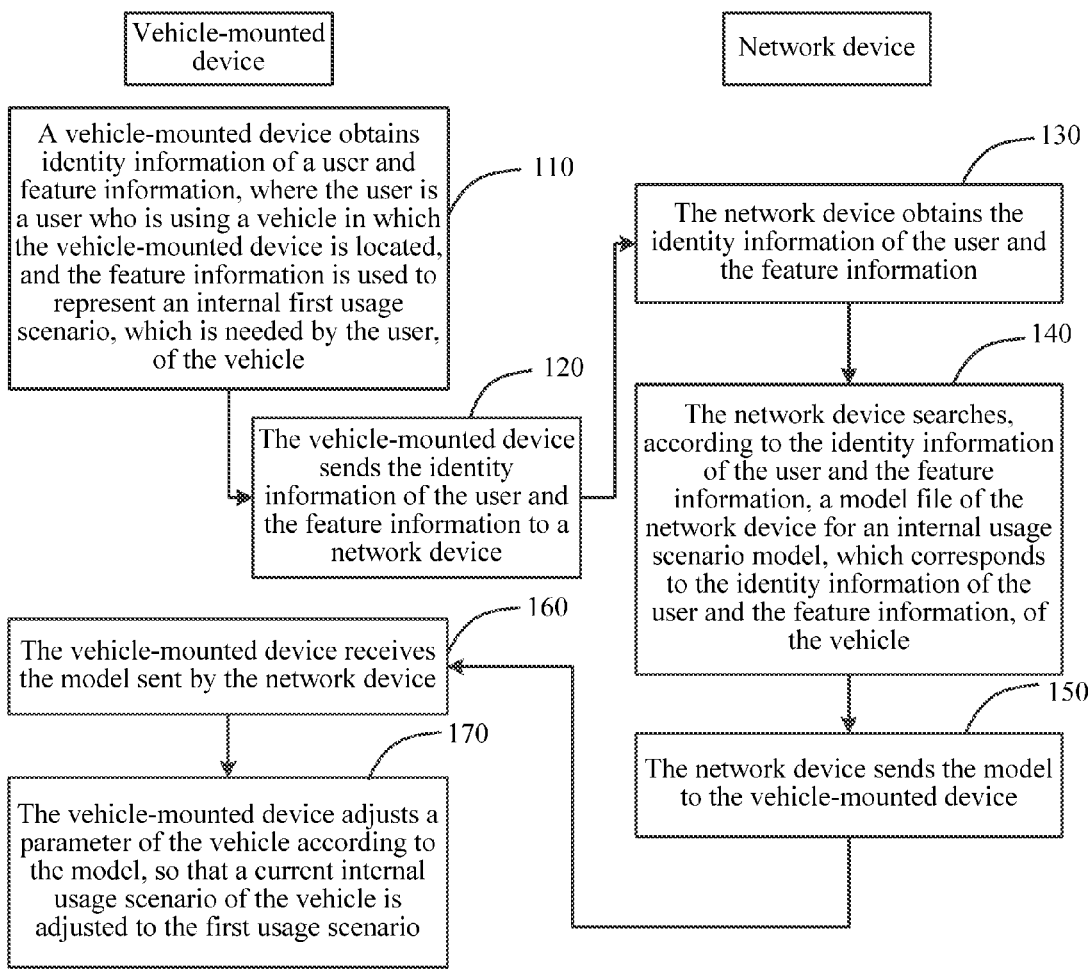
FIG. 1 and FIG. 2 are a flowchart of a method for setting an internal usage scenario of a vehicle (from the perspective of interaction between a vehicle-mounted device and a network device) according to an implementation manner of this application.

To make the technical solution of this application better understood, the following first provides, from the perspective of interaction between a vehicle-mounted device and a network device, a method for setting an internal usage scenario of a vehicle, to describe the technical solution of this application. FIG. 1 is a flowchart of a method for setting an internal usage scenario of a vehicle (from the perspective of interaction between a vehicle-mounted device and a network device) according to an implementation manner of this application. The method for setting a scenario may be used in a vehicle. The method for setting a usage scenario includes the following steps.

Step 110: The vehicle-mounted device obtains identity information of a user and feature information, where the user is a user who is using a vehicle in which the vehicle-mounted device is located, and the feature information is used to represent an internal first usage scenario, which is needed by the user, of the vehicle.

Step 120: The vehicle-mounted device sends the identity information of the user and the feature information to a network device.

Step 130: The network device obtains the identity information of the user and the feature information.

Step 140: The network device searches, according to the identity information of the user and the feature information, a model file of the network device for an internal usage scenario model, which corresponds to the identity information of the user and the feature information, of the vehicle.

Step 150: The network device sends the model to the vehicle-mounted device.

Step 160: The vehicle-mounted device receives the model sent by the network device.

Step 170: The vehicle-mounted device adjusts a parameter of the vehicle according to the model, so that a current internal usage scenario of the vehicle is adjusted to the first usage scenario.

In step 110, a communications module and a processor are disposed in the vehicle-mounted device, where the communications module is configured to receive data sent by the network device or send data to the network device, and the processor controls and adjusts a device in the vehicle. The identity information of the user may be obtained by an identity identification apparatus by identifying an identity (ID), a fingerprint, a palm print, an iris, a voiceprint, a face, or the like of the user.

The feature information may be information entered by the user, or may be context information of the user, where the context information is used to represent a usage scenario needed by the user. The context information of the user includes a world state of the user at a given time point, and a context of the user may relate to various aspects of an environment, a status, or a circumstance of the user. For example, the context of the user may be one of or a combination of multiple of a current driving parameter of a vehicle in which the user is located, a current user image parameter, and a current input parameter of an internal device of the vehicle. The current driving parameter may be acquired using a driving control apparatus. For example, the current driving parameter is a driving destination, an estimated driving time, a current time, a current driving mode, a traffic status, or the like. The current user image parameter may be obtained after an image collection unit such as a camera acquires an image, for example, acquires an eye closing frequency, or the like of the user. The current input parameter of the internal device of the vehicle may be obtained from voice information of the user entered using a microphone, gesture information of the user recognized using a gesture recognition apparatus, or the like.

The usage scenario may be of multiple types, for example, a travel and leisure scenario, a business scenario, a long-distance driving scenario, a rest scenario, and a child scenario. Before the description of how to obtain the usage scenario from the feature information, the identification file used to identify the usage scenario is first described, where the identification file may be directly stored locally, that is, stored in the vehicle-mounted device, or may be stored in the network device. In addition, the identification file may be separately set for each different user, or only one general usage scenario identification file that can be used by different users may be set. The identification file includes at least multiple usage scenarios and feature information that corresponds to the multiple usage scenarios.

After the feature information is obtained, the feature information may be directly sent to the network device, and then the network device identifies, from the stored identification file, a usage scenario corresponding to the feature information; or the vehicle-mounted device may directly identify, in the identification file stored in the vehicle-mounted device (if the identification file is stored in the network device, the network device first sends the identification file to the vehicle-mounted device for storage), a corresponding usage scenario according to the feature information, and then send the corresponding usage scenario to the network device.

In the identification file, it may be set that feature information corresponding to the travel and leisure scenario is the driving destination is a scenic spot, the current time is a holiday time in a schedule of the user, an audio device receives a voice including a word such as "travel" or "leisure", and so on; feature information corresponding to the business scenario is the current time is a work time or a habitual business activity time in a schedule of the user, the driving destination complies with a business activity site in the schedule of the user, an audio device receives a voice including a word "business", and so on; feature information corresponding to the long-distance scenario is the estimated driving time is longer than three hours, and so on; feature information corresponding to the rest scenario is an eye closing time of the user is longer than 30 seconds per minute or the eye closing frequency is greater than two times per minute, and an audio device receives a voice including a word "rest" or "sleep"; and feature information corresponding to the child scenario may be a face of a child is recognized, and an audio device receives a voice including a word "child". For example, if feature information obtained by the vehicle-mounted device is that the eye closing frequency of the user is three times per minute, a vehicle internal usage scenario needed by the user is the rest scenario.

After sending the identity information and the feature information to the network device, first, the vehicle-mounted device acquires a usage scenario according to the feature information, when the identification file is set for a particular user, the network device acquires, according to the identity information of the user, an identification file corresponding to the identity information of the user, and then acquires, from identification file according to the feature information, a usage scenario corresponding to the feature information; or when the identification file is applicable to different users, the network device directly acquires, from the identification file according to the feature information, a usage scenario corresponding to the feature information. Next, the network device acquires, from a database of the network device according to the identity information of the user, a usage scenario file corresponding to the identity information of the user. Finally, the network device acquires, from the usage scenario file according to the usage scenario, an internal usage scenario model, which corresponds to the usage scenario, of the vehicle, and sends the model to the vehicle-mounted device.

In this implementation manner, the acquiring a usage scenario according to the feature information is performed by the network device, and in another implementation manner, the acquiring a usage scenario according to the feature information may also be performed by the vehicle-mounted device. When the identification file is set for a particular user, after the vehicle-mounted device sends the identity information of the user to a network device, the network device acquires, according to the identity information of the user, an identification file corresponding to the identity information of the user, and sends the identification file to the vehicle-mounted device; and the vehicle-mounted device acquires, from the identification file according to the feature information, a usage scenario corresponding to the feature information, and sends the usage scenario to the network device. When the identification file is applicable to different users, the identification file may be directly stored in the vehicle-mounted device, or may be periodically or aperiodically sent by the network device to the vehicle-mounted device, or periodically or aperiodically updated by the network device. After the vehicle-mounted device obtains the feature information, the vehicle-mounted device directly acquires, from the identification file according to the feature information, a usage scenario corresponding to the feature information, and then sends the usage scenario to the network device.

Before step 140 is described, a database that includes internal usage scenario models of the vehicle and that is in the network device is first described, where the database generally includes identity information of multiple users and usage scenario files respectively corresponding to the identity information of the multiple users. The usage scenario file is generally set for a particular user, that is, one usage scenario file is separately set for each user. Each usage scenario file includes multiple usage scenarios, and internal usage scenario models, which respectively correspond to the multiple usage scenarios, of the vehicle.

Each internal usage scenario model of the vehicle is a parameter or a parameter set that is set in a usage scenario according to a preference of the user, for one or more devices of the vehicle. The internal usage scenario model of the vehicle may be a parameter or a parameter set that is stored by the vehicle-mounted device and that is set by the user for one or more devices of the vehicle when the user previously uses the vehicle in a usage scenario corresponding to the internal usage scenario model of the vehicle, that is, a recorded set of history settings of the user in the usage scenario is transmitted to the network device and is saved as the internal usage scenario model of the vehicle; or the internal usage scenario model of the vehicle may be a parameter set that is preset (on a network device end or on the vehicle-mounted device, where after the parameter set is preset on the vehicle-mounted device, the vehicle-mounted device needs to send the parameter set to the network device) by the user for one or more devices of the vehicle.

For example, a model for the travel and leisure scenario of the user is turn on an audio and video device, and play an audio and a video that introduce a destination scenic spot; a model for the business scenario of the user is turn on a video phone, and turn on a vehicle-mounted computer; a usage scenario model for the rest scenario of the user is turn off a light, turn off acoustic equipment, and adjust a seat to a lying mode; a model for the child scenario of the user is turn on an audio and video device, and play a cartoon that children like.

The network device searches, according to the received identity information of the user and the usage scenario, for a corresponding internal usage scenario model of the vehicle, and sends the model to the vehicle-mounted device.

In addition, in another implementation manner, it may also be that, the identification file is not set, and the identity information of the user and the feature information that corresponds to the model are directly added to the usage scenario file, that is, after obtaining the identity information of the user and the feature information, the vehicle-mounted device directly sends the identity information of the user and the feature information to the network device, and the network device acquires the corresponding internal usage scenario model of the vehicle according to the identity information of the user and the feature information, and sends the model to the vehicle-mounted device.

In step 170, after receiving the model, the vehicle-mounted device adjusts a parameter of a corresponding device of the vehicle according to one or more scenario parameters of the model, so that the parameter of the device is consistent with the model parameter.

Descriptions are provided by still using the foregoing rest scenario as an example. After identifying that the current scenario is the rest scenario, the network device obtains, according to the identity information of the user and the rest scenario, an internal usage scenario model, which corresponds to the identity information of the user and the rest scenario, of the vehicle; if the model corresponding to the rest scenario of the user is turn off a light, turn off acoustic equipment, and adjust a seat to a lying mode, a light of the vehicle is turned off, acoustic equipment is turned off, and a seat is adjusted to the lying mode according to the model.

Figure 2:
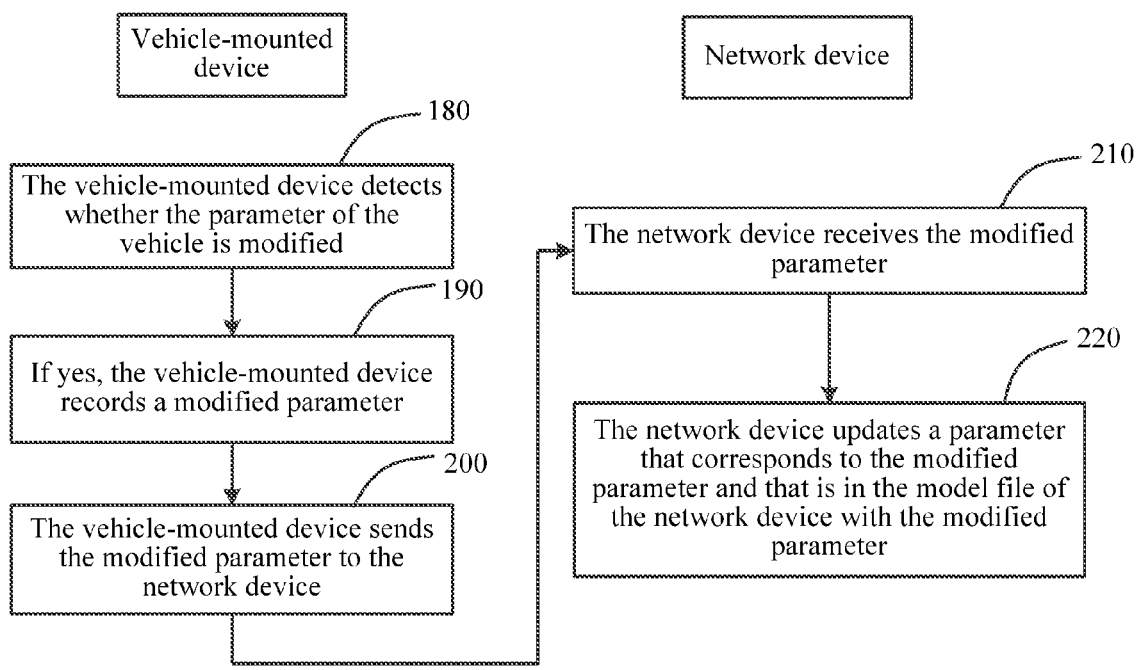

As shown in FIG. 2, further, after step 170, the method further includes the following steps.

Step 180: The vehicle-mounted device detects whether the parameter of the vehicle is modified.

Step 190: If yes, the vehicle-mounted device records a modified parameter.

Step 200: The vehicle-mounted device sends the modified parameter to the network device.

Step 210: The network device receives the modified parameter.

Step 220: The network device updates a parameter that corresponds to the modified parameter and that is in the model file of the network device with the modified parameter.

In other words, after the parameter of the corresponding device of the vehicle is adjusted according to the model sent by the network device to the vehicle-mounted device, so that the parameter of the device is consistent with the model parameter, if a user is not satisfied with a scenario parameter in a current use mode, the user may adjust the parameter of the device of the vehicle using the vehicle-mounted device. Descriptions are provided by still using the foregoing rest scenario as an example. After the vehicle-mounted device turns off the light of the vehicle, turns off the acoustic equipment, and adjusts the seat to the lying mode (assuming that a tilt angle of the seat is 180 degrees in the lying mode), the user hopes that the seat can recline, that is, be in a half lying mode, with a tilt angle of 45 degrees; therefore, the user may adjust the tilt angle of the seat to 45 degrees, reaching the tilt angle of 45 degrees needed by the user; after the user completes the adjustment, the vehicle-mounted device records the tilt angle of 45 degrees of the seat, and sends the tilt angle of 45 degrees to the network device; after receiving the tilt angle of 45 degrees, the network device correspondingly updates the tilt angle of 180 degrees in the model file with the tilt angle of 45 degrees, for direct invocation next time.

Further, after step 170, the method further includes the following steps.

Step 230: The vehicle-mounted device detects whether there is new feature information, where the new feature information is used to represent a second usage scenario needed by the user, and the second usage scenario may be the same as the first usage scenario, or may be different from the first usage scenario.

Step 240: If yes, the vehicle-mounted device determines, according to the new feature information, whether an internal usage scenario of the vehicle needs to be adjusted.

In other words, after the parameter of the corresponding device of the vehicle is adjusted according to the internal usage scenario model of the vehicle sent by the network device to the vehicle-mounted device, so that the parameter of the device is consistent with the model parameter, it is periodically or aperiodically detected whether there is new feature information. For example, when the user does not need to rest and needs to conduct business, the internal usage scenario of the vehicle needs to change; the user may enter a word "business" using an input device such as a microphone, and then the vehicle-mounted device obtains new feature information: "business", and determines, according to the new feature information, using the new feature information, whether the internal usage scenario of the vehicle needs to be adjusted. For example, in this case, the vehicle-mounted device directly sends the new feature information to the network device, and the network device obtains a corresponding usage scenario according to the new feature information; or the vehicle-mounted device obtains a usage scenario according to the new feature information. The vehicle-mounted device detects a current internal usage scenario of the vehicle, and if the current usage scenario does not match the usage scenario obtained using the new feature information, the vehicle-mounted device determines that the internal usage scenario of the vehicle needs to be adjusted. The network device obtains the usage scenario according to the identity information of the user and the new feature information, searches, according to the usage scenario, the database for an internal usage scenario model, which corresponds to the identity information of the user and the usage scenario, of the vehicle, and then sends the model to the vehicle-mounted device. The vehicle-mounted device adjusts a parameter of the vehicle according to the model, so that the current internal usage scenario of the vehicle can be adjusted to the usage scenario corresponding to the new feature information.

In addition, before step 120, that is, before the vehicle-mounted device sends the identity information of the user and the feature information to the network device, it may be first determined whether the current usage scenario of the vehicle matches the internal usage scenario, which is needed by the user, of the vehicle, and if the current usage scenario of the vehicle does not match the internal usage scenario, which is needed by the user, of the vehicle, the vehicle-mounted device sends the identity information of the user and the feature information to the network device. After the vehicle-mounted device obtains the identity information of the user and the feature information, the vehicle-mounted device locally searches for a usage scenario corresponding to the feature information, or sends the feature information to the network device, and the network device obtains a corresponding usage scenario according to the feature information; a current internal usage scenario of the vehicle is detected, and it is determined whether the current usage scenario is consistent with the obtained usage scenario; and if the current usage scenario is not consistent with the obtained usage scenario, the vehicle-mounted device sends the identity information of the user and the feature information to the network device.

In the foregoing method for setting an internal usage scenario of a vehicle, an internal usage scenario model of the vehicle is stored on a network device end; the vehicle-mounted device obtains identity information of a user who is using the vehicle and feature information used to represent a vehicle internal usage scenario needed by the user, and then sends the identity information and the feature information to a network device; the network device obtains the internal usage scenario model of the vehicle according to the identity information of the user and the feature information, and sends the model to the network device; and after receiving the model sent by the network device, the vehicle-mounted device adjusts a parameter of the vehicle according to the model. Therefore, when using a different vehicle, the user does not need to set parameters on the vehicle again, and the vehicle-mounted device of the vehicle simply needs to send the identity information of the user and the feature information used to represent the vehicle internal usage scenario needed by the user to the network device, and then can receive the internal usage scenario model of the vehicle, where the model is obtained by the network device according to the identity information of the user and the feature information; and the vehicle-mounted device adjusts the parameter of the vehicle according to the model, resolving a technical problem in the prior art that, when using a different vehicle, a user needs to set parameters on the vehicle again but cannot use preference parameter information stored in a previously used vehicle.

In addition, the vehicle-mounted device sets the parameter of the vehicle according to the internal usage scenario model, which is set according to the identity information of the user, of the vehicle, and the model corresponds to a usage scenario, that is, in the foregoing method, the vehicle-mounted device can perform scenario setting according to a scenario in which the user is currently located, which meets increasingly refined use requirements of the user, improves use comfort of the user, and resolves a technical problem that in the prior art, there is only one group of preference parameter information for one user while different preference parameter information cannot be provided for the user in different situations, causing inconvenience to the user.

Figure 3:
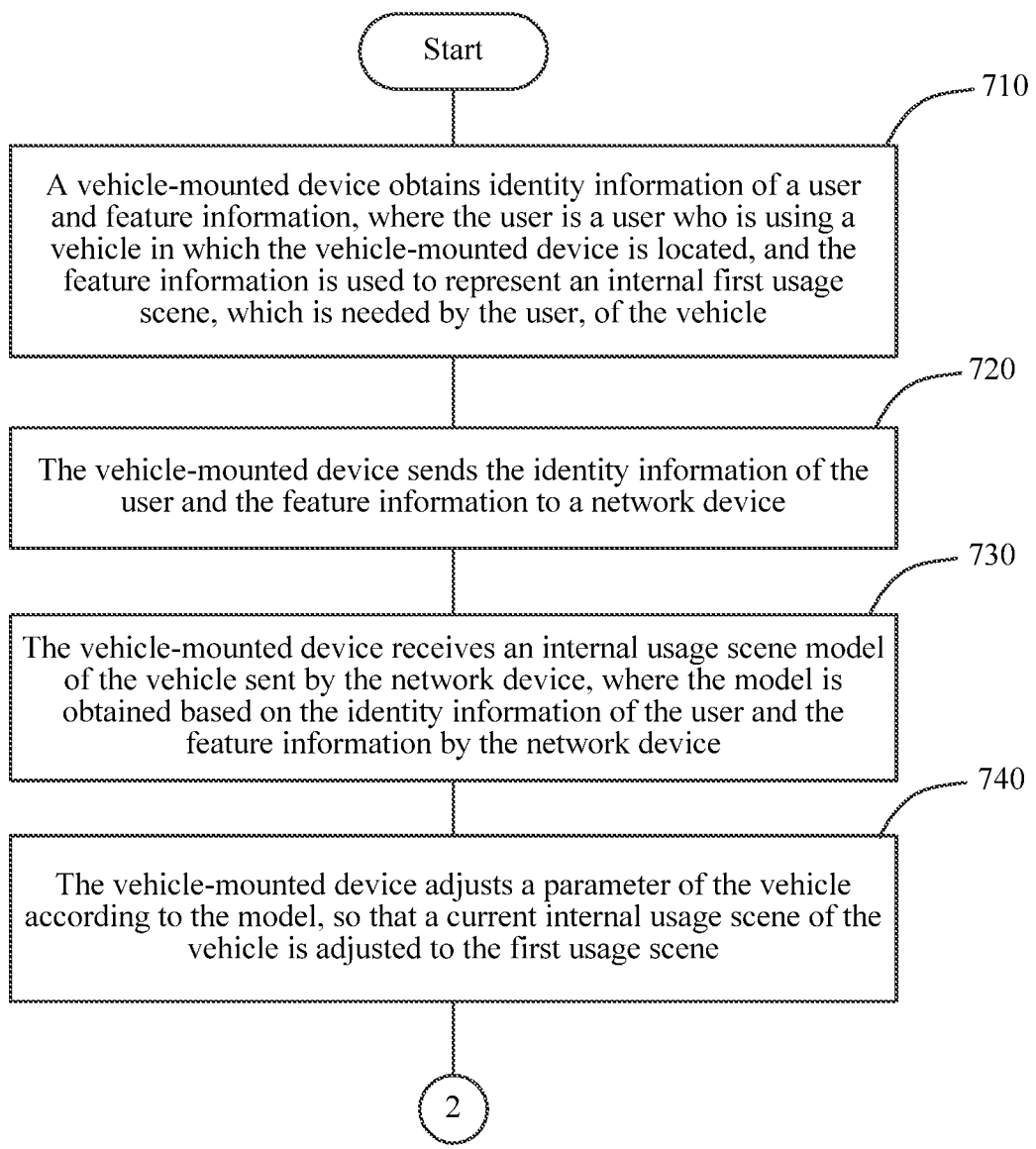
FIG. 3 to FIG. 5 are a flowchart of a method for setting an internal usage scenario of a vehicle (from the perspective of a vehicle-mounted device side) according to an implementation manner of this application.

Based on a same disclosure conception, a method for setting an internal usage scenario of a vehicle is provided from the perspective of a vehicle-mounted device side. FIG. 3 is a flowchart of a method for setting an internal usage scenario of a vehicle (from the perspective of a vehicle-mounted device side) according to an implementation manner of this application. The method for setting an internal usage scenario of a vehicle (from the perspective of the vehicle-mounted device side) includes the following steps.

Step 710: A vehicle-mounted device obtains identity information of a user and feature information, where the user is a user who is using a vehicle in which the vehicle-mounted device is located, and the feature information is used to represent an internal first usage scenario, which is needed by the user, of the vehicle.

Step 720: The vehicle-mounted device sends the identity information of the user and the feature information to a network device.

Step 730: The vehicle-mounted device receives an internal usage scenario model of the vehicle sent by the network device, where the model is obtained by the network device based on the identity information of the user and the feature information.

Step 740: The vehicle-mounted device adjusts a parameter of the vehicle according to the model, so that a current internal usage scenario of the vehicle is adjusted to the first usage scenario.

In a specific implementation manner, optionally, after the vehicle-mounted device obtains the feature information, the method further includes searching, by the vehicle-mounted device, an identification file of the vehicle-mounted device according to the feature information, to obtain the first usage scenario; and the sending, by the vehicle-mounted device, the feature information to a network device is sending, by the vehicle-mounted device, the first usage scenario to the network device.

In a specific implementation manner, optionally, the obtaining, by the vehicle-mounted device, the feature information is acquiring, by the vehicle-mounted device, context information of the user, where the context information is used to represent a usage scenario needed by the user.

In a specific implementation manner, optionally, the context information is one of or a combination of multiple of a current driving parameter of the vehicle, an image parameter of the user, or an input parameter of an internal device of the vehicle.

In a specific implementation manner, optionally, the usage scenario model is a parameter or a parameter set that is set for one or more devices of the vehicle according to a preference of the user.

Figure 4:
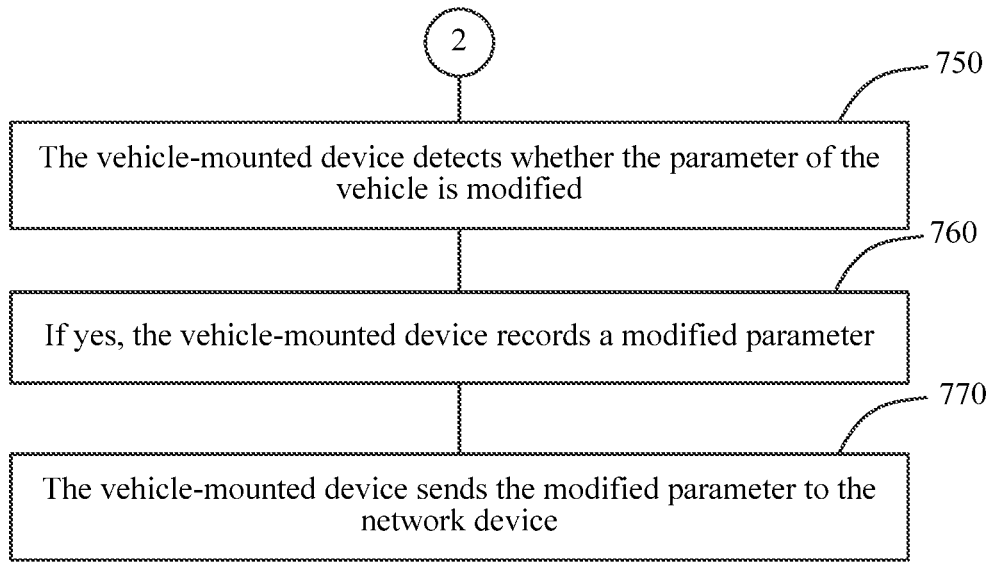

As shown in FIG. 4, further, after step 740, the method further includes the following steps.

Step 750: The vehicle-mounted device detects whether the parameter of the vehicle is modified.

Step 760: If yes, the vehicle-mounted device records a modified parameter.

Step 770: The vehicle-mounted device sends the modified parameter to the network device.

Figure 5:
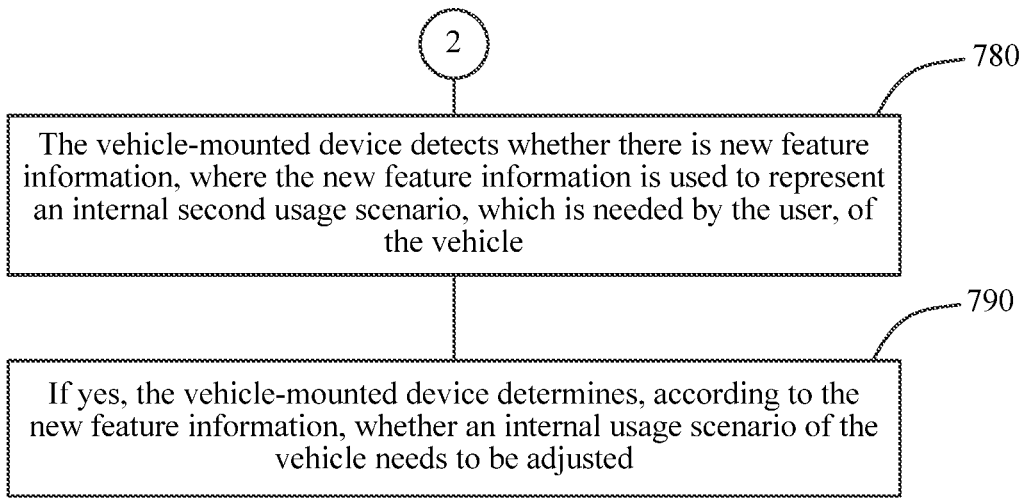

As shown in FIG. 5, further, after step 740, the method further includes the following steps.

Step 780: The vehicle-mounted device detects whether there is new feature information, where the new feature information is used to represent an internal second usage scenario, which is needed by the user, of the vehicle.

Step 790: If yes, the vehicle-mounted device determines, according to the new feature information, whether an internal usage scenario of the vehicle needs to be adjusted.

Figure 6:
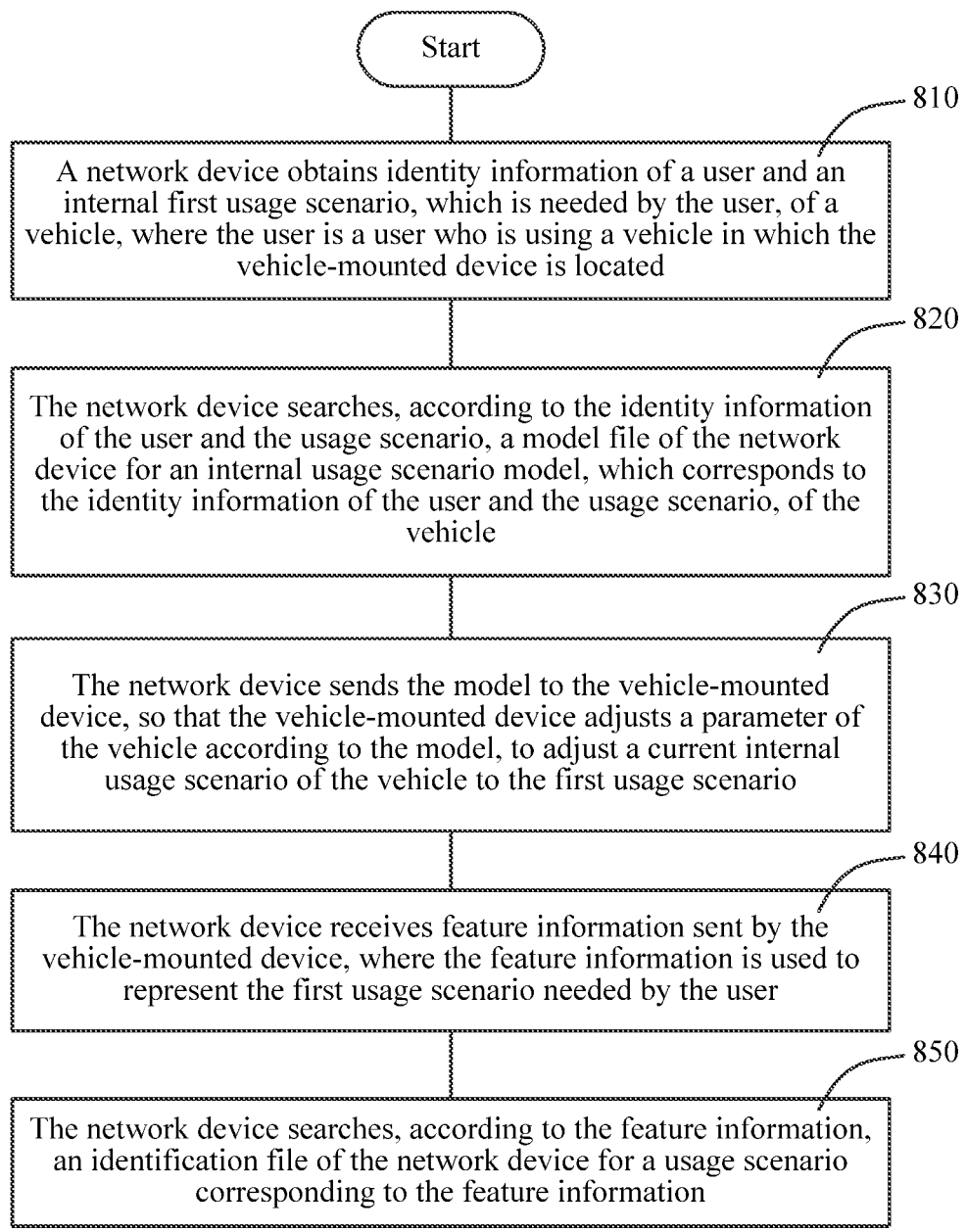
FIG. 6 is a flowchart of a method for setting an internal usage scenario of a vehicle (from the perspective of a network device side) according to an implementation manner of this application.

Based on a same disclosure conception, a method for setting an internal usage scenario of a vehicle is provided from the perspective of a network device side. FIG. 6 is a flowchart of a method for setting an internal usage scenario of a vehicle (from the perspective of a network device side) according to an implementation manner of this application. The method for setting an internal usage scenario of a vehicle (from the perspective of the network device side) includes the following steps.

Step 810: A network device obtains identity information of a user and an internal first usage scenario, which is needed by the user, of a vehicle, where the user is a user who is using a vehicle in which the vehicle-mounted device is located.

Step 820: The network device searches, according to the identity information of the user and the usage scenario, a model file of the network device for an internal usage scenario model, which corresponds to the identity information of the user and the usage scenario, of the vehicle.

Step 830: The network device sends the model to the vehicle-mounted device, so that the vehicle-mounted device adjusts a parameter of the vehicle according to the model, to adjust a current internal usage scenario of the vehicle to the first usage scenario.

In a specific implementation manner, optionally, after the obtaining, by a network device, identity information of a user, the method includes searching, by the network device according to the identity information of the user, a database of the network device for an identification file corresponding to the identity information of the user; and sending the identification file to the vehicle-mounted device.

In a specific implementation manner, optionally, before the obtaining, by a network device, an internal first usage scenario, which is needed by the user, of a vehicle, the method further includes the following steps.

Step 840: The network device receives feature information sent by the vehicle-mounted device, where the feature information is used to represent the first usage scenario needed by the user.

Step 850: The network device searches, according to the feature information, an identification file of the network device for a usage scenario corresponding to the feature information.

In the foregoing method for setting an internal usage scenario of a vehicle, the vehicle-mounted device obtains identity information of a user who is using a vehicle in which the vehicle-mounted device is located and feature information used to represent an internal usage scenario, which is needed by the user, of the vehicle, and then sends the identity information and the feature information to a network device; the network device obtains an internal usage scenario model of the vehicle according to the identity information of the user and the feature information, and sends the model to the vehicle-mounted device; and after receiving the model sent by the network device, the vehicle-mounted device adjusts a parameter of the vehicle according to the model, so that a current internal usage scenario of the vehicle is adjusted to the first usage scenario, thereby avoiding that the user performs parameter setting again on the vehicle being used, to resolve a prior-art technical problem that when using a different vehicle, a user needs to set parameters on the vehicle again but cannot use preference parameter information stored in a previously used vehicle, which causes inconvenience to the user.

Embodiment 2

Figure 7:
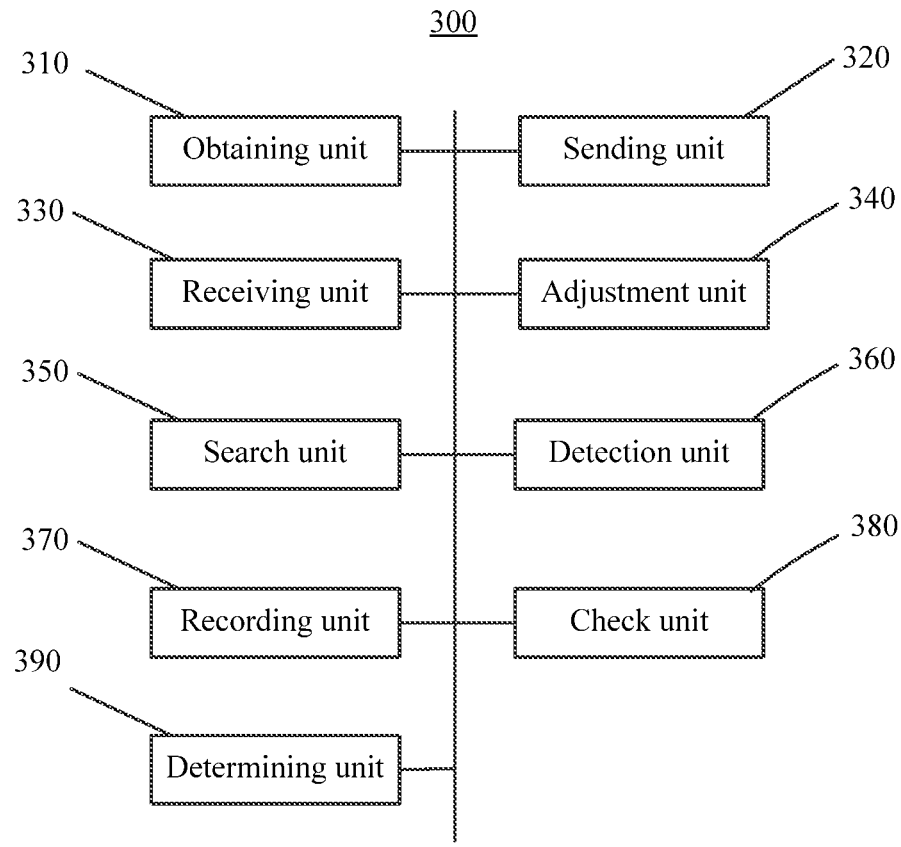
FIG. 7 is a schematic structural block diagram of a vehicle-mounted device according to another implementation manner.

Based on a same disclosure conception, this embodiment provides a vehicle-mounted device from the perspective of a vehicle-mounted device side. FIG. 7 is a schematic structural block diagram of a vehicle-mounted device according to another implementation manner. The vehicle-mounted device 300 includes an obtaining unit 310 configured to obtain identity information of a user and feature information, where the user is a user who is using a vehicle in which the vehicle-mounted device is located, and the feature information is used to represent an internal first usage scenario, which is needed by the user, of the vehicle; a sending unit 320 configured to send the identity information of the user and the feature information to a network device; a receiving unit 330 configured to receive an internal usage scenario model of the vehicle sent by the network device, where the model is obtained by the network device based on the identity information of the user and the feature information; and an adjustment unit 340 configured to adjust a parameter of the vehicle according to the model, so that a current internal usage scenario of the vehicle is adjusted to the first usage scenario.

In a specific implementation manner, optionally, the vehicle-mounted device 300 further includes a search unit 350, where the search unit 350 is configured to search an identification file of the vehicle-mounted device 300 according to the feature information, to obtain the first usage scenario; and the sending unit 320 is configured to send the first usage scenario to the network device.

In a specific implementation manner, optionally, the obtaining unit 310 is configured to acquire context information of the user, where the context information is used to represent a usage scenario needed by the user.

In a specific implementation manner, optionally, the context information is one of or a combination of multiple of a current driving parameter of the vehicle, an image parameter of the user, or an input parameter of an internal device of the vehicle.

In a specific implementation manner, optionally, the internal usage scenario model of the vehicle is a parameter or a parameter set that is set for one or more devices of the vehicle according to a preference of the user.

In a specific implementation manner, optionally, the vehicle-mounted device 300 further includes a detection unit 360 configured to detect whether the parameter of the vehicle is modified; and a recording unit 370 configured to, when the parameter of the vehicle is modified, record a modified parameter, where the sending unit 320 is further configured to send the modified parameter to the network device.

In a specific implementation manner, optionally, the vehicle-mounted device 300 further includes a check unit 380 configured to detect whether there is new feature information, where the new feature information is used to represent a second usage scenario needed by the user; and a determining unit 390 configured to, when there is the new feature information, determine, according to the new feature information, whether an internal usage scenario of the vehicle needs to be adjusted.

Figure 8:
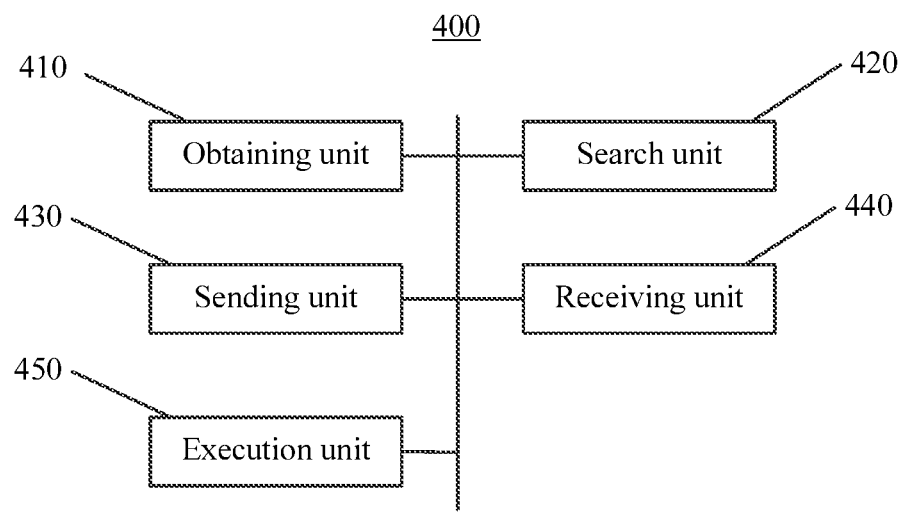
FIG. 8 is a schematic structural block diagram of a network device according to another implementation manner.

Based on a same disclosure conception, a network device is provided from the perspective of a network device side. FIG. 8 is a schematic structural block diagram of a network device according to another implementation manner. The network device 400 includes an obtaining unit 410 configured to obtain identity information of a user and an internal first usage scenario, which is needed by the user, of the vehicle, where the user is a user who is using a vehicle in which the vehicle-mounted device is located; a search unit 420 configured to search, according to the identity information of the user and information about the usage scenario, a model file of the network device 400 for an internal usage scenario model, which corresponds to the identity information of the user and the usage scenario, of the vehicle; and a sending unit 430 configured to send the model to the vehicle-mounted device, so that the vehicle-mounted device adjusts a parameter of the vehicle according to the model, to adjust a current internal usage scenario of the vehicle to the first usage scenario.

In a specific implementation manner, optionally, the search unit 420 is further configured to search, according to the identity information of the user, a database of the network device 400 for an identification file corresponding to the identity information of the user; and the sending unit 430 is configured to send the identification file to the vehicle-mounted device.

In a specific implementation manner, optionally, the network device 400 further includes a receiving unit 440, where the receiving unit 440 is configured to receive feature information sent by the vehicle-mounted device, and the feature information is used to represent the first usage scenario needed by the user; and the search unit 420 is further configured to search, according to the feature information, an identification file of the network device for a usage scenario corresponding to the feature information.

In a specific implementation manner, optionally, the receiving unit 440 is further configured to receive a modified parameter of the vehicle sent by the vehicle-mounted device; and the network device 400 further includes an execution unit 450, where the execution unit 450 is configured to update a parameter that corresponds to the modified parameter and that is in the model file of the network device with the modified parameter.

By means of the vehicle-mounted device 300 and the network device 400, the vehicle-mounted device obtains identity information of a user who is using a vehicle in which the vehicle-mounted device is located and feature information used to represent an internal usage scenario, which is needed by the user, of the vehicle, and then sends the identity information and the feature information to the network device; the network device obtains an internal usage scenario model of the vehicle according to the identity information of the user and the feature information, and sends the model to the vehicle-mounted device; and after receiving the model sent by the network device, the vehicle-mounted device adjusts a parameter of the vehicle according to the model, so that a current internal usage scenario of the vehicle is adjusted to the first usage scenario, thereby avoiding that the user performs parameter setting again on the vehicle being used, to resolve a prior-art technical problem that when using a different vehicle, a user needs to set parameters on the vehicle again but cannot use preference parameter information stored in a previously used vehicle, which causes great inconvenience to the user.

Embodiment 3

Figure 9:
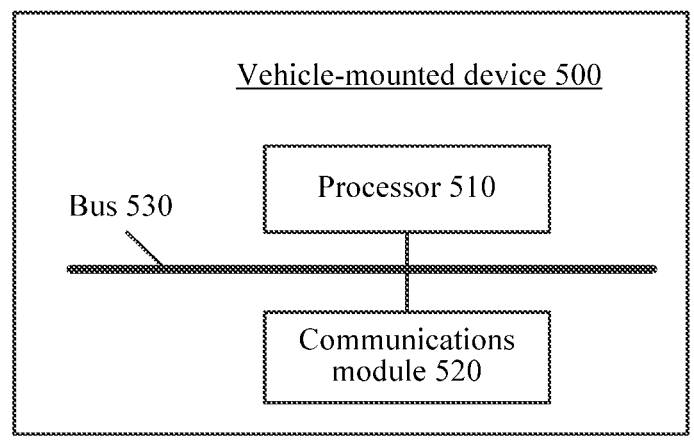
FIG. 9 is a schematic structural block diagram of a vehicle-mounted device according to still another implementation manner.

Based on a same disclosure conception, this embodiment provides a vehicle-mounted device from the perspective of a vehicle-mounted device side. FIG. 9 is a schematic structural block diagram of a vehicle-mounted device 500 according to still another implementation manner. The vehicle-mounted device 500 includes a processor 510 configured to obtain identity information of a user and feature information, where the user is a user who is using a vehicle in which the vehicle-mounted device 500 is located, and the feature information is used to represent an internal first usage scenario, which is needed by the user, of the vehicle; and a communications module 520, connected to the processor 510 using a bus 530, and configured to send the identity information of the user and the feature information to a network device, and receive an internal usage scenario model of the vehicle sent by the network device, where the model is obtained by the network device based on the identity information of the user and the feature information, where the processor 510 is further configured to adjust a parameter of the vehicle according to the model, so that a current internal usage scenario of the vehicle can be the first usage scenario.

In a specific implementation manner, optionally, the processor 510 is further configured to search an identification file of the vehicle-mounted device according to the feature information, to obtain the corresponding first usage scenario; and the communications module 520 is configured to send the first usage scenario to the network device.

In a specific implementation manner, optionally, the processor 510 is configured to acquire context information of the user, where the context information is used to represent a usage scenario needed by the user.

In a specific implementation manner, optionally, the context information is one of or a combination of multiple of a current driving parameter of the vehicle, an image parameter of the user, or an input parameter of an internal device of the vehicle.

In a specific implementation manner, optionally, the internal usage scenario model of the vehicle is a parameter or a parameter set that is set for one or more devices of the vehicle according to a preference of the user.

In a specific implementation manner, optionally, the processor 510 is further configured to detect whether the parameter of the vehicle is modified, and when the parameter of the vehicle is modified, record a modified parameter; and the communications module 520 is further configured to send the modified parameter to the network device.

In a specific implementation manner, optionally, the processor 510 is further configured to detect whether there is new feature information, and when there is the new feature information, determine, according to the new feature information, whether an internal usage scenario of the vehicle needs to be adjusted, where the new feature information is used to represent a second usage scenario needed by the user.

Figure 10:
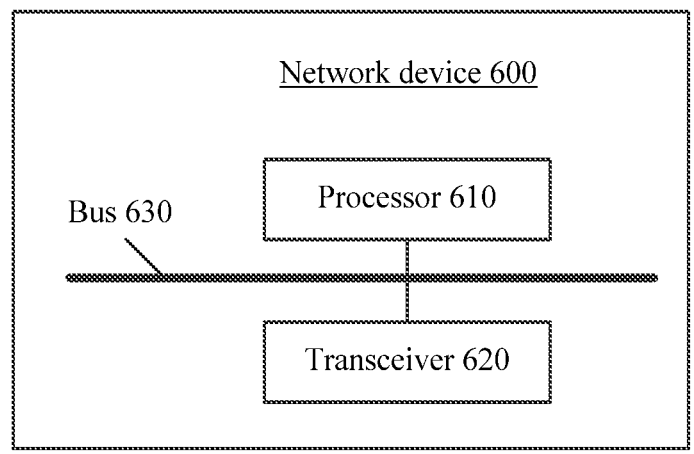
FIG. 10 is a schematic structural block diagram of a network device according to still another implementation manner.

Based on a same disclosure conception, this embodiment provides a network device 600 from the perspective of a network device side. FIG. 10 is a schematic structural block diagram of a network device 600 according to still another implementation manner. The network device 600 includes a transceiver 620 configured to obtain identity information of a user and an internal first usage scenario, which is needed by the user, of a vehicle, where the user is a user who is using a vehicle in which the vehicle-mounted device is located; and a processor 610, connected to the transceiver 620 using a bus 630, and configured to search, according to the identity information of the user and the usage scenario, a model file of the network device 600 for an internal usage scenario model, which corresponds to the identity information of the user and the usage scenario, of the vehicle, where the transceiver 620 is further configured to send the model to the vehicle-mounted device, so that the vehicle-mounted device adjusts a parameter of the vehicle according to the model, to adjust a current internal usage scenario of the vehicle to the first usage scenario.

In a specific implementation manner, optionally, the processor 610 is further configured to search, according to the identity information of the user, a database of the network device 600 for an identification file corresponding to the identity information of the user; and the transceiver 620 is configured to send the identification file to the vehicle-mounted device.

In a specific implementation manner, optionally, the transceiver 620 is configured to receive feature information sent by the vehicle-mounted device, and the feature information is used to represent the first usage scenario needed by the user; and the processor 610 is further configured to search, according to the feature information, an identification file of the network device 600 for a usage scenario corresponding to the feature information.

By means of the vehicle-mounted device 500 and the network device 600, the vehicle-mounted device obtains identity information of a user who is using a vehicle in which the vehicle-mounted device is located and feature information used to represent an internal usage scenario, which is needed by the user, of the vehicle, and then sends the identity information and the feature information to the network device; the network device obtains an internal usage scenario model of the vehicle according to the identity information of the user and the feature information, and sends the model to the vehicle-mounted device; and after receiving the model sent by the network device, the vehicle-mounted device adjusts a parameter of the vehicle according to the model, so that a current internal usage scenario of the vehicle is adjusted to the first usage scenario, thereby avoiding that the user performs parameter setting again on the vehicle being used, to resolve a prior-art technical problem that when using a different vehicle, a user needs to set parameters on the vehicle again but cannot use preference parameter information stored in a previously used vehicle, which causes great inconvenience to the user.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disk read-only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

One person skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for setting an internal usage scenario of a vehicle, comprising:

obtaining, by a vehicle-mounted device, identity information of a user and feature information, wherein the user is a user who is using a vehicle in which the vehicle-mounted device is located, and wherein the feature information is used to represent an internal first usage scenario of the vehicle;

sending, by the vehicle-mounted device, the identity information of the user and the feature information to a network device;

receiving, by the vehicle-mounted device, an internal usage scenario model of the vehicle sent by the network device, wherein the internal usage scenario model is obtained by the network device based on the identity information of the user and the feature information;

adjusting, by the vehicle-mounted device, a parameter of the vehicle according to the internal usage scenario model, such that a current internal usage scenario of the vehicle is adjusted to the internal first usage scenario;

detecting, by the vehicle-mounted device, whether the parameter of the vehicle is modified;

recording, by the vehicle-mounted device, a modified parameter when the parameter of the vehicle is modified; and sending, by the vehicle-mounted device, the modified parameter to the network device.

2. The method according to claim 1, wherein after obtaining, by the vehicle-mounted device, the feature information, the method further comprises searching, by the vehicle-mounted device, an identification file of the vehicle-mounted device according to the feature information in order to obtain the internal first usage scenario, and wherein sending, by the vehicle-mounted device, the feature information to the network device comprises sending, by the vehicle-mounted device, the internal first usage scenario to the network device.

3. The method according to claim 1, wherein obtaining, by the vehicle-mounted device, the feature information comprises acquiring, by the vehicle-mounted device, context information of the user, and wherein the context information is used to represent a usage scenario.

4. The method according to claim 3, wherein the context information is at least one of a current driving parameter of the vehicle, an image parameter of the user, and an input parameter of an internal device of the vehicle.

5. The method according to claim 1, wherein the internal usage scenario model of the vehicle comprises a parameter or a parameter set that is set for one or more devices of the vehicle according to a preference of the user.

6. The method according to claim 1, wherein after adjusting, by the vehicle-mounted device, the parameter of the vehicle according to the internal usage scenario model, such that the current internal usage scenario of the vehicle is adjusted to the internal first usage scenario, the method further comprises:

detecting, by the vehicle-mounted device, whether there is new feature information, wherein the new feature information is used to represent an internal second usage scenario of the vehicle; and determining, by the vehicle-mounted device according to the new feature information, whether an internal usage scenario of the vehicle is to be adjusted when there is new feature information.

7. A method for setting an internal usage scenario of a vehicle, comprising:

obtaining, by a network device, identity information of a user and an internal first usage scenario of a vehicle, wherein the user is a user who is using a vehicle in which a vehicle-mounted device is located;

searching, by the network device according to the identity information of the user and the internal first usage scenario, a model file of the network device for an internal usage scenario model of the vehicle, wherein the internal usage scenario model corresponds to the identity information of the user and the internal first usage scenario;

sending, by the network device, the internal usage scenario model to the vehicle-mounted device, such that the vehicle-mounted device adjusts a parameter of the vehicle according to the internal usage scenario model in order to adjust a current internal usage scenario of the vehicle to the internal first usage scenario;

receiving, by the network device, a modified parameter of the vehicle sent by the vehicle-mounted device; and updating, by the network device, a parameter that corresponds to the modified parameter and that is in the model file of the network device with the modified parameter.

8. The method according to claim 7, wherein after obtaining, by the network device, the identity information of the user, the method comprises:

searching, by the network device according to the identity information of the user, a database of the network device for an identification file corresponding to the identity information of the user; and sending the identification file to the vehicle-mounted device.

9. The method according to claim 7, wherein before obtaining, by the network device, the internal first usage scenario of a vehicle, the method further comprises:

receiving, by the network device, feature information sent by the vehicle-mounted device, wherein the feature information is used to represent the internal first usage scenario; and searching, by the network device according to the feature information, an identification file of the network device for a usage scenario corresponding to the feature information.

10. A vehicle-mounted device, comprising:

a processor configured to obtain identity information of a user and feature information, wherein the user is a user who is using a vehicle in which the vehicle-mounted device is located, and the feature information is used to represent an internal first usage scenario of the vehicle;

a transmitter configured to send the identity information of the user and the feature information to a network device; and a receiver configured to receive an internal usage scenario model of the vehicle sent by the network device, wherein the internal usage scenario model is obtained by the network device based on the identity information of the user and the feature information, wherein the processor is configured to adjust a parameter of the vehicle according to the internal usage scenario model, such that a current internal usage scenario of the vehicle is adjusted to the internal first usage scenario a detector configured to detect whether the parameter of the vehicle is modified; and a recorder configured to record a modified parameter when the parameter of the vehicle is modified, wherein the transmitter is further configured to send the modified parameter to the network device.

11. The vehicle-mounted device according to claim 10, wherein the processor is further configured to search an identification file of the vehicle-mounted device according to the feature information in order to obtain the internal first usage scenario, and wherein the transmitter is configured to send the internal first usage scenario to the network device.

12. The vehicle-mounted device according to claim 10, wherein the processor is further configured to acquire context information of the user, and wherein the context information is used to represent a usage scenario.

13. The vehicle-mounted device according to claim 12, wherein the context information is at least one of a current driving parameter of the vehicle, an image parameter of the user, and an input parameter of an internal device of the vehicle.

14. The vehicle-mounted device according to claim 10, wherein the internal usage scenario model of the vehicle is a parameter or a parameter set that is set for one or more devices of the vehicle according to a preference of the user.

15. The vehicle-mounted device according to claim 10, wherein the processor is further configured to:
  detect whether there is new feature information, wherein the new feature information is used to represent a second usage scenario; and
  determine, when there is the new feature information, whether an internal usage scenario of the vehicle is to be adjusted according to the new feature information.

16. A network device, comprising:
  a processor configured to:
    obtain identity information of a user and an internal first usage scenario of a vehicle, wherein the user is a user who is using a vehicle in which a vehicle-mounted device is located; and
    search, according to the identity information of the user and the internal first usage scenario, a model file of the network device for an internal usage scenario model, which corresponds to the identity information of the user and the internal first usage scenario, of the vehicle;
  a transmitter coupled to the processor and configured to send the internal usage scenario model to the vehicle-mounted device, such that the vehicle-mounted device adjusts a parameter of the vehicle according to the internal usage scenario model in order to adjust a current internal usage scenario of the vehicle to the internal first usage scenario; and
  a receiver coupled to the processor and configured to receive a modified parameter of the vehicle sent by the vehicle-mounted device, and wherein the processor is configured to update a parameter that corresponds to the modified parameter and that is in the model file of the network device with the modified parameter.

17. The network device according to claim 16, wherein the processor is further configured to search, according to the identity information of the user, a database of the network device for an identification file corresponding to the identity information of the user, and wherein the transmitter is configured to send the identification file to the vehicle-mounted device.

18. The network device according to claim 16, wherein the network device further comprises a receiver configured to receive feature information sent by the vehicle-mounted device, wherein the feature information is used to represent the internal first usage scenario, and wherein the processor is further configured to search, according to the feature information, an identification file of the network device for a usage scenario corresponding to the feature information.

* * * * *